Oct. 22, 1963
A. E. THORSON ETAL
3,107,676
AUTOMATIC VEHICLE WASHING PLANT
Filed Oct. 30, 1961
2 Sheets-Sheet 1
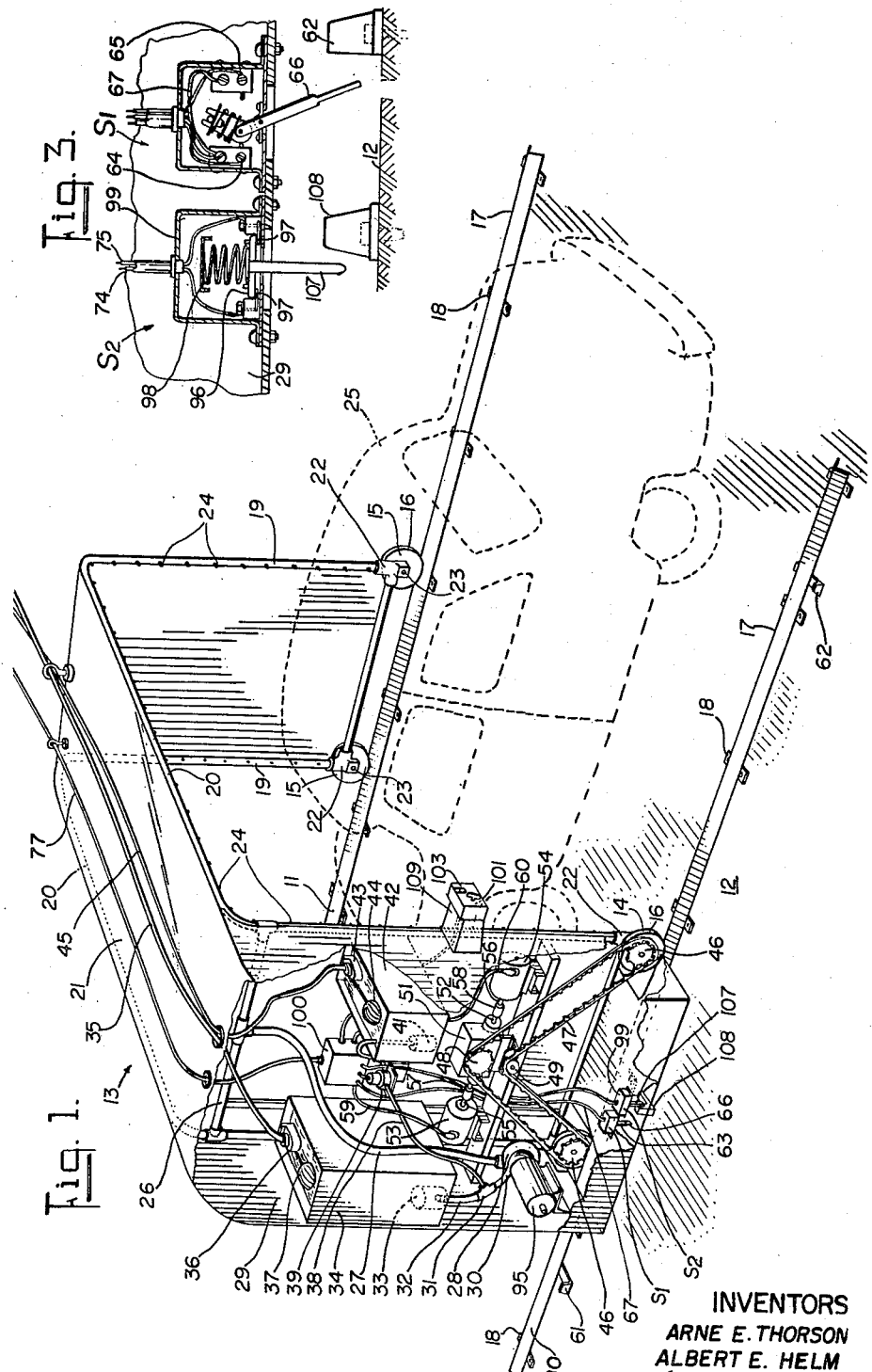
INVENTORS
ARNE E. THORSON
ALBERT E. HELM
Ross L. Gray
patent agent Oct. 22, 1963  A. E. THORSON ETAL  3,107,676
AUTOMATIC VEHICLE WASHING PLANT
Filed Oct. 30, 1961  2 Sheets-Sheet 2
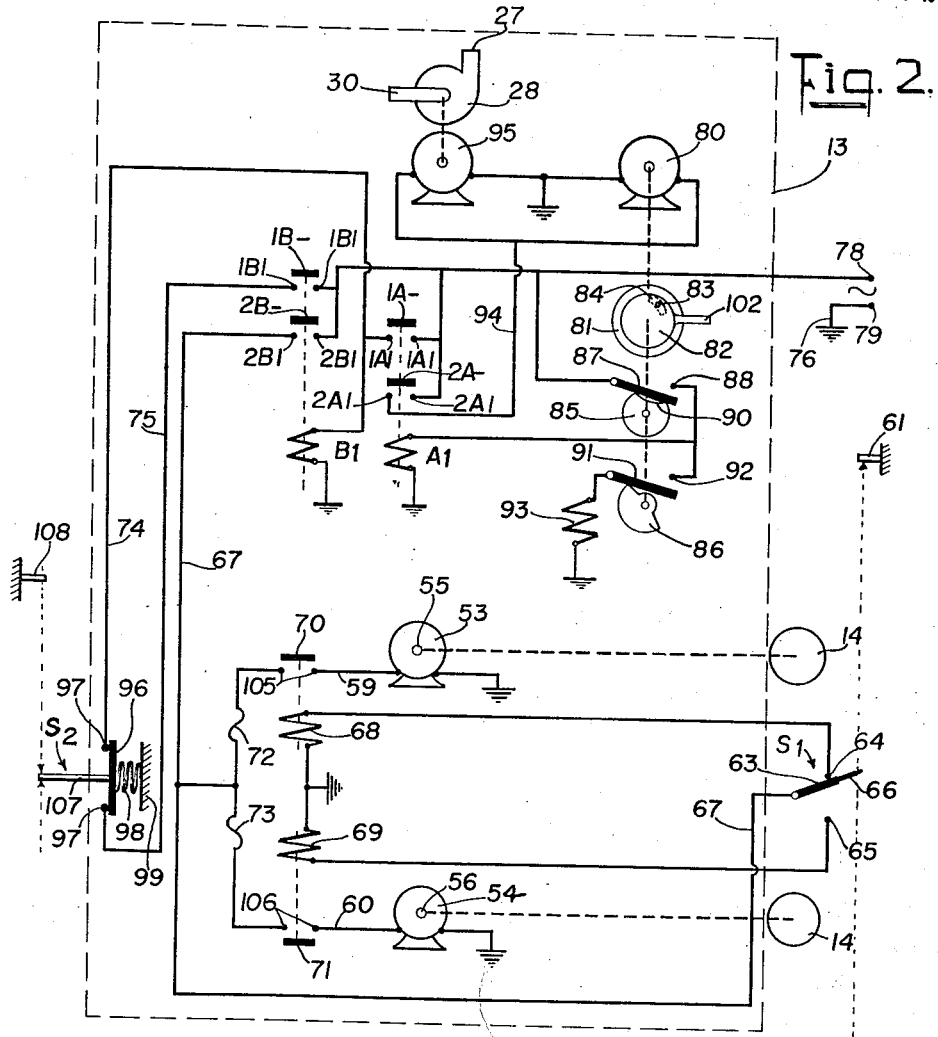
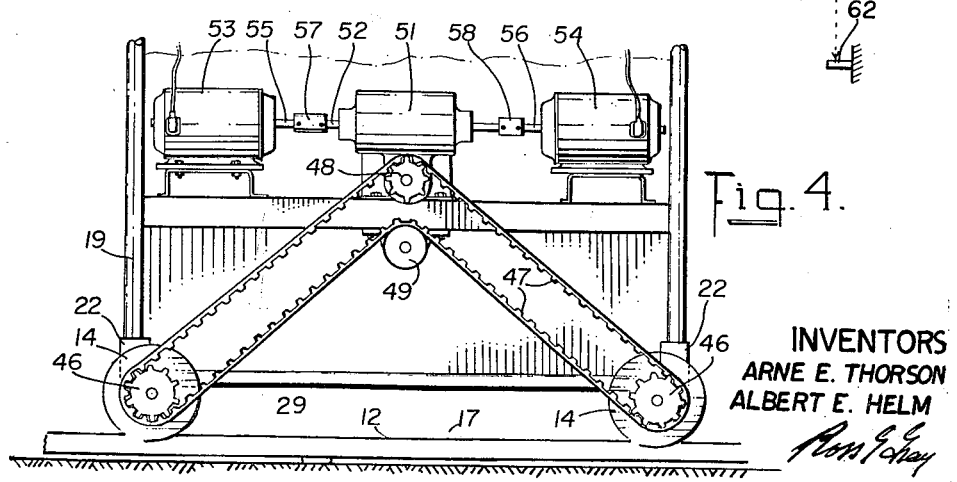
INVENTORS
ARNE E. THORSON
ALBERT E. HELM
patent agent

United States Patent Office 3,107,676
Patented Oct. 22, 1963

3,107,676
AUTOMATIC VEHICLE WASHING PLANT
Arne E. Thorson, Calgary, Alberta, and Albert E. Helm, Edmonton, Alberta, Canada, assignors to Auto-Magic Industries Ltd., Edmonton, Alberta, Canada
Filed Oct. 30, 1961, Ser. No. 148,327
7 Claims. (Cl. 134—58)

This invention concerns improvements in apparatus for cleansing vehicular equipment and is specifically concerned with an automatic vehicle washing plant having a programmed washing cycle.

The practice of the invention provides a washing station for cleaning vehicles by automatic means which require little or no manual labor or attention apart from maintenance, so that the station may, for the most part, be substantially unattended, each washing cycle being initiated, for example, by a patron.

The invention is embodied in a washing station which essentially comprises an organization of movable carrier structure, powered driving means for reciprocating the structure with respect to a washing area, powered liquid jetting means, and a programmed cycle control unit, the station being arranged so that a floor mounted track supports the reciprocable carrier on which discharge nozzles are fixed and on which a supply of cleansing liquid, a water tank, powered traction means and pump means are carried, and so that on starting the washing cycle the control unit automatically times the periods of delivery of cleansing liquid and of water to the nozzles as the latter are passed back and forth over a vehicle stationed so as to be impinged by jets of liquid, and terminates the cycle with the carrier parked at a predetermined parking position intermediate limit positions.

In apparatus constructed according to the invention, means are preferably also provided for automatically driving the carrier on starting from its parked position toward a predetermined limit position, which may advantageously be in the direction toward which an automobile would move to leave the washing station.

Preferably the delivery of liquid according to a program of operations is arranged for initial discharge of a mixture of water and cleansing liquid through the nozzles, e.g. a water solution of soap or a soapless detergent, during an interval corresponding to the time required for the carrier to move two or more traversals along the track over a vehicle undergoing cleansing, and thereafter solely rinse water is discharged from the nozzles until the end of the program.

A specific construction of an automobile washing station according to the invention will be described in the following portion of this specification with reference to the accompanying drawings, in which, FIGURE 1 is a perspective view of an automatic programed washing apparatus in operation showing by dashed lines the relative position in phantom outline of an automotive vehicle undergoing cleansing;

FIGURE 2 is a schematic diagram of the electrical circuits of the driving system and cycle timing apparatus of FIGURE 1;

FIGURE 3 is an enlarged elevation view showing detail of the parking control and limit tabs of FIGURE 1; and, FIGURE 4 is an elevation view showing the drive system.

In the apparatus illustrated, a pair of parallelly aligned ground supported tracks 10 and 11 are suitably secured on a deck or floor 12. Supported on the tracks, which are conveniently realized as lengths of angle section structural steel, with the apex of the right angle pointing upward, is a carrier designated as 13 having track engaging driven wheels 14 and non-driven wheels 15. The wheels are peripherally grooved at 16 to engage and be guided upon the angle edge 17. Base strips 18 welded along the lower margins of the track section at intervals are suitably affixed to the floor or deck 12.

The carrier comprises a rigidly braced framework in the form of a pair of inverted U-shaped pipes having vertical leg portions 19 and a horizontal upper joining portion 20. Each pipe is supported in a vertical plane spaced from and parallel with the other, and the pipes are braced by a sheet metal arch member 21 which is coextensive with and joined by its margins with the pipe frames. Leg portions 19 have their lower ends stopped and are received suitably in wheel-supporting brackets 22, which support fixed axles 23.

A plurality of nozzles 24 are received in communicating relation in the wall of each pipe, being spaced apart by suitable distances along the pipe length and positioned to direct jets of liquid inwardly of the opening of the U upon a vehicle such as that indicated at 25 stationed under the arch. The jets may be directed in the plane of the U or may diverge slightly from the plane, as desired.

Each U-pipe is connected to receive fluid supplied from a common supply pipe 26, the latter forming a transverse frame brace, and being fed from the delivery line 27 which in turn is fed from the outlet of electrically driven pump 28. The pump is preferably supported between the lower leg portions of the pipes, within a vertically elongate enclosure or housing 29 extending above the driven wheels to one side of the U frames. Connected with the inlet side of the pump is the intake pipe 30 which leads to a branching fitting or T 31, one branch 32 whereof leads to a filter 33. The latter has its inlet submerged in water supply tank 34 carried in the upper part of the housing above the pump. Flexible hose line 35 which is suspended suitably above ground to be carried along with the traversing movements of the carrier, and which is connected with a source of water (not shown) under pressure, is arranged to replenish the tank through a float-controlled valve 36 regulated by float member 37, as water is withdrawn by the pump.

A second branch 38 leading from fitting 31 is connected by way of suction pipe 40 through the electrically controlled valve 39 and filter 41 with the contents of cleansing liquid supply tank 42. The level of liquid in the tank is controlled by float valve 43 and float 44, by replenishment from a remote supply (not shown) fed under pressure by flexible hose 45 which may be ganged with flexible water line 35. Preferably, the level of the bottom of the cleansing liquid tank is three feet or more higher than the pump intake. Alternatively, a supply of concentrated cleansing liquid sufficient for a predetermined period of continuous operation may be carried in an enlarged supply tank 42, so that hose 45 is not necessary.

Mounted within the housing 29 are the drive system and electrical control devices therefor, as will presently be described with particular reference to FIGURES 2 and 4.

A sprocket 46 is fixed on the side of each of the track-engaging driven wheels 14, and is connected by drive chain 47 with driving sprockets 48 and idler sprockets 49. The driving sprocket is fast on output shaft 50 of speed reducer unit 51, which has an input shaft 52 connected for drive from either of two electric motors 53 and 54. Their respective motor shafts 55 and 56 are ganged through respective couplings 57 and 58 with the input shaft 52 of the speed reducer unit 51, for joint rotation. Motor 53 is arranged to rotate when energized from supply conductor 59 in a direction opposite to the direction of rotation of motor 54 when the latter is energized from its conductors 60. The drive control system is arranged to supply electrical current to one motor at a time only, as will become evident hereinafter, and is further arranged so that upon disconnection of one motor from its supply conductor, there is a delay before the other motor is connected to its respective supply conductors to allow moving elements to come to a stop.

Referring additionally to FIGURE 3, the operation of the traversing control system will now be described. The track 10 is provided with a pair of limit control tabs 61 and 62 spaced at predetermined positions along its length, being adjustably fastened to the track outside of the path of driven wheels 14. Secured upon the lower end of housing 29 is a reversing toggle switch S1, having a pivoted actuator arm 63 deflectable to either side between alternative rest positions. Whenever the actuator arm's path intersects a reversing tab located adjacent the limits of the carrier traverse movements, switch S1 is deflected to make contact with the other one of alternate contacts 64 and 65. The lever arm is preferably provided with a resiliently flexible extension strip 66.

A conductor 67 which during operation of the carrier is arranged to be continuously energized, is connectable either with contact 64 to energize electromagnetic relay 68 and thereby to supply electric current by way of arm 70 and associated contacts 105 to forward drive motor 53, or is connectable with contact 65 to energize electromagnetic relay 69 and thereby to energize reverse drive motor 54 over arm 71 and contacts 106. Suitable protective fuse or circuit breaker means 72 and 73 are respectively connected between conductor 67 and switches 70 and 71 in series with the motor supply leads 74 and 75, and common supply conductor 76 which may be ground.

A control unit 100 supported within housing 29 is co-operatively associated with timer unit 101, the latter being mounted externally of the housing. The washing cycle is initiatable by any suitable manipulative operation, as for instance by the payment of coins by a patron, or closing a switch by an attendant, and the like. In the drawing a coin receptacle 103 is provided for actuation of the timer upon insertion of the proper coin or coins.

Timer unit 101 includes an electrical constant speed motor 80, such as a clockwork gear motor, arranged to drive a disc 81 ganged with follower 82 at a low speed, for example at one revolution in two minutes or a longer time. The follower carries a pin 83 which is moveable in an arcuate slot 84 recessed in disc 81, to provide limited angular play between driving and driven members. Follower 82 is fast to two or more timing cams, namely a primary cam 85 and a secondary cam 86. Actuation of follower 82 in the clockwise direction, whereby to cause its pin 83 to move a few degrees in slot 84, turns the timer cams sufficiently that switch arm 87 associated with cam 85 closes on contact 88. Such mechanical movement may be provided by any suitably exposed actuator arm or link 102 coupled with follower 82, to enable a patron or attendant to initiate the starting operation by its manipulation, and the movement is preferably produced as the result of inserting one or more coins into receptacle 103 by means well known in the art of vending machines, such means forming, per se, no part of the present invention.

Assuming electrical current to be supplied from a source such as distribution mains by flexible cable 77, to energize power input terminals 78, 79, the winding of electromagnetic relay A1 will be energized by way of switch arm 87, contact 88 and conductor 89. Relay arms 1A— and 2A— will close on respective contacts 1A1 and 2A1 and will remain energized during the interval while the elevated portion of cam 85 holds the arm on its contact, i.e., until the dwell portion 90 allows the arm to disengage its contact. As soon as 2A— closes, current is supplied over conductor 94 to motor 80, which rotates to drive cams 85 and 86 clockwise. Current is also supplied to pump motor 95.

Cam 86 is shaped so that it closes switch arm 91 on its associated contact 92 either at the same time as arm 87 closes on contact 88, or very shortly thereafter when initial rotation by the disc 81 has picked up and moved follower 82 sufficiently. Solenoid 93 in circuit with contact 92 is thereby energized permitting detergent or other cleansing liquid to be fed through electrically controlled valve 39 to pump 28 throughout an interval determined by the arcuate extent of the raised portion of cam 86. The mixture of relatively concentrated cleansing solution commingles with water in the intake pipe 30 in predetermined proportions, as will be established by the relative hydrostatic pressure heads due to liquid levels in tanks 34 and 42, as well as by frictional losses in filters and lines. Therefore, a mixture of water and cleansing liquid will be discharged under pressure from the outlet or pump 28 shortly after timer 101 is actuated, as a number of jets impinging upon the vehicle stationed upon the washing area.

As soon as conductor 94 is energized, electromagnetic relay B1 is energized, causing switch arms 1B— and 2B— to bridge respective contacts 1B1 and 2B1. The latter connect electrical supply with conductor 67, to bring the drive system for the carrier into operation, as has previously been described. The closing of 1B— on its contacts extends a path leading from supply terminal 78 by way of conductor 75 to conductor 74 by way of switch bar 96 and contacts 97 of parking control switch S2. The switch bar is normally biased into closed contact relation by spring 98 secured in support body 99, and is unseated to open one or the other contact whenever its actuating arm 107 is deflected from the rest position. The switch is carried at the base of housing 29 with arm 107 extending downwardly, and its path intersects deflector tab 108 protruding upwardly and secured to a track support strip 18. As the carrier moves in either direction with respect to the washing area, actuator arm 107 strikes tab 108 to open contacts 97 briefly.

Cam 86 is shaped so that after a predetermined number of passes of the carrier back and forth over an automobile stationed in the washing area, it breaks connection between the arm 91 and contact 92, shutting off the supply of cleansing liquid to the pump inlet. As the pump remains energized, once the mixture is flushed out of the pipes, the nozzles continue to spray water only on the vehicle.

After a further interval of time has elapsed, as determined by the shape of cam 85 and its recessed sector 90, arm 87 breaks connection with contact 88. A1 is thereby de-energized, opening the circuit to motor 80 and stopping the operation of pump 28.

B1 does not de-energize even though contacts 1A1 are no longer bridged to connect the winding with supply terminals 78, 79. As long as a path remains completed via conductors 74 and 75, switch bar 96, and contacts 97, conductor 74 remains supplied over 1B— which holds B1 operated and contacts 1B1 closed. Therefore the carrier continues to move, until at its next pass over the parking control tab 108, arm 107 is actuated to open contacts 97.

Immediately, B1 releases so that 2B— is disconnected, from contacts 2B1, and motor supply bus 67 is de-energized.

As will be evident from an inspection of the control circuits, carrier 13 will remain at rest in the parked position until the further actuation of time 100 again connects supply with the winding of electromagnetic relay A1.

By choosing a distance between positions of limit tabs 61 and 62 and a washing cycle duration such that the carrier completes an odd number of traversals but less than an even number of traversals in the time that arm 87 remains closed, the carrier will always move initially in a predetermined direction on starting each washing cycle. The de-energization of A1 may advantageously be timed to occur when the carrier has arrived at any position between its rearward limit position and the position at which arm 107 is deflected by parking tab 108 to open contacts 97. Accordingly, the carrier will come to rest while making its forward run, and subsequent actuation of timer 109 will re-energize forward drive motor 53 to move the carrier toward its forward limit position.

The parked position of the carrier is advantageously so located that a vehicle driver may deposit the required coin or coins in receptacle 103 from the seated position, the housing extension 109 being sufficiently offset from the nearest U-pipe that on commencement of spraying, no liquid will wet the arm of the payee. The distance of travel from the parked position to the forward limit position will consequently be the lesser, but will still be sufficient that the patron may alight from the vehicle and leave the washing area after having started up the washing cycle, before the carrier passes back over the vehicle. Alternatively, the driver may choose to remain seated in the vehicle after closing the windows until the completion of the cycle.

While the specific embodiment of a preferred form of an automatic washing apparatus has been described with reference to a drive system employing a pair of separate drive motors ganged to a common speed reducer unit, it is contemplated that a single motor of the reversing type may be substituted, for example where a three phase supply is available and drive control relays connect the windings suitable for either forward or reverse drive of the carrier.

Moreover, any additional number of cams may be employed for closing respective circuits to control additional operations such as supply of air blasts, wax sprays, and other treatments commonly given to vehicle body finishes, and it is to be understood that the specific washing cycle illustrated may be departed from considerably without altering the basic concepts of the present invention as claimed in the appended claims.

We claim:

1. An automatic vehicle cleansing station comprising a moveable carrier supporting cleansing means, drive means for repeatedly reciprocating said carrier back and forth between fixed limit positions, an interval timer, a drive control means and a cleansing control means each operable on actuation of said timer respectively to energize said drive means to move said carrier and to operate a sequence of cleansing operations by said cleansing means, said cleansing control means being responsive to termination of said interval to stop said cleansing operations, a drive stop control means responsive to passage of said carrier over a parking position intermediate said limit positions to stop said drive means, and means to hold said stop control means inoperative during the whole of said interval.

2. A station as clamped in claim 1 wherein said drive means is operative to traverse said carrier a predetermined number of times from one limit position to the other during said interval so that said stop control means stops said carrier while it is moving in the same direction as when it started.

3. A station as claimed in claim 1 having an electrical supply and electrically powered drive means, and wherein said drive control means comprise a first circuit, a first electromagnetic relay energizable from said supply on actuation of said timer and effective to connect said supply with said first circuit, a second circuit, a second electromagnetic relay energizable from said first circuit and effective to connect said supply with said second circuit to energize said drive means, said drive stop control means comprising a third circuit connected with said second circuit for holding said second electromagnetic relay self-energized, and comprising a normally closed biased switch connected in series in said third circuit, and switch actuating means arranged to open said normally closed switch whenever said carrier passes over said parking position, said stop control means bring ineffective to deenergize said second electromagnetic relay and to stop said drive except when said first electromagnetic relay has been de-energized by said timer upon termination of said interval to disconnect said supply from said first circuit.

4. In an automatic programmed washing station, the combination with a moveable arch structure having a plurality of hydraulic nozzles for jetting liquids under pressure, of an interval timer, programming means to control a sequence of liquid jetting operations each having a predetermined duration, said sequence commencing upon actuation of said timer and terminating coextensive with said interval, drive programming means to control the movement of said arch to perform a predetermined number of traversals between spaced apart limit positions at substantially constant speed commencing with the start of said interval and continuing independently of said drive programming means after the termination of said interval and stop means responsive to traversal of said carrier over at a predetermined parking position intermediate said limit positions effective to stop said carrier at said parking position after the termination of said interval.

5. A station as claimed in claim 4 wherein said arch moves a distance corresponding to an even number of traversals before coming to a stop at said parking position.

6. In a vehicle washing station, the combination of a floor-supported wheeled frame guided for movement over and along a vehicle stationing area, drive means for reciprocably moving the frame between fixed limit positions at opposite ends of said area, a plurality of hydraulic nozzles carried on the frame arranged to jet streams of liquid therefrom upon a portion of said vehicle stationing area, a supply of cleansing liquid and a supply of water, means to select either water alone or a mixture of water and said cleansing liquid, pump means for jetting a selected liquid under pressure as streams from said nozzles, an interval timer, a programming unit actuated on commencement of said interval effective to energize said drive means and to selectably jet liquids according to a predetermined sequence during said interval, and drive stop control means including stop means fixed on said floor and responsive to passage of said frame over said stop means to stop said drive means, and means to hold said drive stop control means inoperative during the duration of said interval.

7. A station as claimed in claim 6 wherein said drive means are electrically powered and reversing stop means are fixed on said floor at opposite end of said area and a single pole two-position switch on said frame in actuated in turn by said reversing stop means to reverse the direction of applied drive, and wherein said drive stop control means comprise as electromagnetic relay having its winding energized coextensively with said interval to energize said drive means, and said relay is also energized by a self-holding circuit which includes a normally closed switch arranged to be opened whenever said frame is passing over said stop means, whereby to cause de-energization of said drive means provided that said interval has expired.

References Cited in the file of this patent
UNITED STATES PATENTS 2,703,579    Merancy    Mar. 8, 1955
2,756,759    Swain    July 31, 1956